(12) United States Patent
Carpenter et al.

(10) Patent No.: US 10,165,158 B2
(45) Date of Patent: Dec. 25, 2018

(54) COVERT SURVEILLANCE SYSTEM CONCEALMENT KIT FOR RAPID DEVELOPMENT

(71) Applicants: Robert Carpenter, Clearwater, FL (US); Grady Valentine, Largo, FL (US)

(72) Inventors: Robert Carpenter, Clearwater, FL (US); Grady Valentine, Largo, FL (US)

(73) Assignee: DTC Communications Inc., Pinellas Park, FL (US)

( * ) Notice: Subject to any disclaimer, the term of this patent is extended or adjusted under 35 U.S.C. 154(b) by 287 days.

(21) Appl. No.: 15/212,147

(22) Filed: Jul. 15, 2016

(65) Prior Publication Data
US 2018/0115686 A1 Apr. 26, 2018

Related U.S. Application Data

(60) Provisional application No. 62/193,171, filed on Jul. 16, 2015.

(51) Int. Cl.
*H04N 5/77* (2006.01)
*H04N 5/225* (2006.01)
(Continued)

(52) U.S. Cl.
CPC ......... *H04N 5/2252* (2013.01); *G08B 15/001* (2013.01); *G11B 27/10* (2013.01);
(Continued)

(58) Field of Classification Search
CPC .. H04N 5/2252; H04N 7/181; H04L 63/0428; H04R 1/406; H04R 1/028; G11B 27/10
(Continued)

(56) References Cited

U.S. PATENT DOCUMENTS 6,812,970 B1  11/2004  McBride
8,781,292 B1   7/2014  Ross et al.
(Continued)

OTHER PUBLICATIONS

Domo Tactical Communications LLC, International Search Report and Written Opinion, PCT/US2016/042657, dated Oct. 5, 2016, 10 Pgs.
Domo Tactical Communications LLC, International Preliminary Report on Patentability, PCT/US2016/042657, dated Jan. 16, 2018, 9 Pgs.
(Continued)

*Primary Examiner* — Robert Chevalier
(74) *Attorney, Agent, or Firm* — Morgan, Lewis & Bockius LLP

(57) ABSTRACT

A concealment system is configured to be concealed within a host device for covert surveillance. The concealment system includes a housing configured to be concealed within a host device for covert surveillance. The housing encloses a processor and components electronically coupled to the processor including: at least one sensor interface to connect to at least one sensor for capturing information, a real-time clock to generate timestamps, a tamper protection module to receive the captured information from the at least one sensor interface, add the timestamps generated by the real-time clock to the captured information, and encrypt the captured information, at least one wireless communication module to wirelessly connect to at least one wireless communication antenna to transmit the encrypted captured information to a remote device, and rewritable memory to store the encrypted captured information.

20 Claims, 4 Drawing Sheets

(51) Int. Cl.
*G08B 15/00* (2006.01)
*G11B 27/10* (2006.01)
*H04L 29/06* (2006.01)
*H04N 7/18* (2006.01)
*H04R 1/02* (2006.01)
*H04R 1/40* (2006.01)
*G08B 13/196* (2006.01)

(52) U.S. Cl.
CPC ......... *H04L 63/0428* (2013.01); *H04N 7/181* (2013.01); *H04R 1/028* (2013.01); *H04R 1/406* (2013.01); *G08B 13/19671* (2013.01)

(58) Field of Classification Search
USPC ........ 386/226, 227, 224, 223, 230, 231, 259
See application file for complete search history.

(56) References Cited

U.S. PATENT DOCUMENTS

| | | | |
|---|---|---|---|
| 2004/0008253 | A1* | 1/2004 | Monroe .......... G08B 13/19641 348/143 |
| 2005/0055479 | A1 | 3/2005 | Zer et al. |
| 2005/0190557 | A1 | 9/2005 | Zhan et al. |
| 2006/0126844 | A1 | 6/2006 | Mauro |
| 2009/0027498 | A1* | 1/2009 | Owen ................. H04N 7/183 348/151 |
| 2009/0203355 | A1 | 8/2009 | Clark |
| 2010/0273452 | A1 | 10/2010 | Rajann et al. |
| 2010/0289627 | A1 | 11/2010 | McAllister |
| 2013/0039472 | A1 | 2/2013 | Morton |
| 2014/0122879 | A1* | 5/2014 | Cummings ............. G06F 21/85 713/168 |
| 2014/0308031 | A1 | 10/2014 | Han et al. |

* cited by examiner

COVERT SURVEILLANCE SYSTEM CONCEALMENT KIT FOR RAPID DEVELOPMENT

RELATED APPLICATIONS

This application claims priority to U.S. Provisional Patent Application Ser. No. 62/193,171, filed Jul. 16, 2015, entitled "DIY Covert Surveillance System Concealment Kit for Rapid Development," which is incorporated by reference herein in its entirety.

TECHNICAL FIELD

This disclosure relates generally to a surveillance system, and in particular to a concealment system used in covert surveillance.

BACKGROUND

Criminals and their crimes are constantly evolving and getting more sophisticated. As such, it is increasingly challenging for investigators to gather compelling evidence to prove that a crime has been committed. Law enforcement teams often integrate cameras, microphones, wireless communication equipment, and sensors with data recording capability, into commonly found objects like speakers, lamps, coffee machines, scales, street lamps, fire extinguishers, etc. These concealed surveillance systems are otherwise known as "concealments."

Law enforcement officers, intelligence agents, military personnel, and other investigators often find themselves with a brief window of opportunity to configure and place customized concealments to track criminal activities. Unless the particular concealments is adapted to the surroundings are stockpiled in advance and readily available for quick deployment, an undercover operation for evidence collection will not be successful.

However, preparing in advance for a clandestine operation is tedious and time consuming. Further, many existing concealments are not easily configurable and are not susceptible to being hidden in different types of equipment.

SUMMARY

Accordingly, there is a need for a concealment system that substantially less costly to make and configure, requires less effort and time to assemble and produce concealments. Such concealment systems can discretely monitor targets, and gather and preserve vital information.

The most time consuming task in generating any concealment systems is not the placement of the sensors, e.g., cameras, microphones and other data collectors, but rather the concealment system integration. The concealment system described herein includes a small and compact universal surveillance module that flexibly allows for the connection and incorporation of various devices and sensors based on its required application. For example, cameras, microphones, wireless communication equipment, and other sensors can be quickly connected to the universal surveillance module and placed into commonly found objects to produce concealments. The size of the universal surveillance module makes it easy to use and allows for rapid development of volume concealment solutions, such that customers can order concealments from a manufacturer and receive the completed surveillance products that are ready to be installed within a short timeframe. In some cases, the universal surveillance module can be provided to various agencies as a kit, allowing the agencies to quickly build their own concealment solutions conducive to the environment and surroundings that are unique to a specific undercover operation and targeted evidence acquisition.

The concealment system described herein also provides improved intelligence gathering and distribution. Using the concealment system described herein, high quality video/audio data can be recorded discretely. The recorded multimedia data are further processed by the universal surveillance module to add tamper protection before the encrypted data are stored locally and/or streamed to a remote source. In some embodiments, the concealment system described herein also automatically switches between local data storage and streaming to reduce electronic signal detection. Thus, relative to a conventional covert surveillance system, the concealment system described herein provides improved multi-media data collection and concealment, tamper protection, and data preservation.

Some embodiments provide a concealment system that is configured to be concealed within a host device for covert surveillance. The concealment system includes: a housing configured to be concealed within a host device for covert surveillance, the housing enclosing: a processor; at least one sensor interface electrically coupled to the processor, the sensor interface configured to connect to at least one sensor for capturing information; a real-time clock electrically coupled to the processor, the real time clock configured to generate timestamps; a tamper protection module electrically coupled to the processor, the tamper protection module configured to: receive the captured information from the at least one sensor interface, add the timestamps generated by the real-time clock to the captured information, and encrypt the captured information; at least one wireless communication module electrically coupled to the processor, the at least one wireless communication module configured to wirelessly connect to at least one wireless communication antenna to transmit the encrypted captured information to a remote device; and rewritable memory electrically coupled to the processor, the rewritable memory configured to store the encrypted captured information.

In accordance with some embodiments, the housing defines an internal volume of 6 cu inches or less.

In accordance with some embodiments, the housing has a first dimension of 4 inches or less, a second dimension of 3 inches or less, and a third dimension of 0.5 inches or less.

In accordance with some embodiments, the concealment system further includes a single circuit board on which the processor, at least one sensor interface, real-time clock, tamper protection module, and at least one wireless communication module are mounted.

In accordance with some embodiments, the system further includes: a primary circuit board, and a secondary circuit board removably coupled to the primary circuit board within the housing, wherein the processor, including I/O controllers, and the rewritable memory, including low power memory, are mounted on the secondary circuit board, and the at least one sensor interface the real-time clock, the tamper protection module, and the at least one wireless communication module are mounted on the primary circuit board.

In accordance with some embodiments, rewritable memory is a removable SD card coupled to an interface mounted on the secondary circuit board.

In accordance with some embodiments, secondary circuit board has a first dimension of 3.5 inches or less and a second dimension of 2 inches or less.

In accordance with some embodiments, the captured information includes audio, video, or audio and video frames and the tamper protection module adds a sequential number to each successive frame.

In accordance with some embodiments, the captured information is encrypted using Advanced Encryption Standard (AES) algorithm.

In accordance with some embodiments, the captured information is encrypted using an at least 256 bits key size.

In accordance with some embodiments, the housing is radio frequency (RF) transparent, and the at least one wireless communication antenna is internal to the housing.

In accordance with some embodiments, the at least one sensor is clipped to device in which the surveillance concealment system to be concealed.

In accordance with some embodiments, the at least one sensor includes multiple cameras that use different capture or communication technologies and the at least one sensor interface includes multiple camera interfaces, each configured for its respective camera capture or communication technology.

In accordance with some embodiments, the at least one sensor includes multiple microphones for facing different directions or placements in different parts of the device in which the surveillance concealment system to be concealed.

In accordance with some embodiments, the at least one sensor includes an accelerometer, a digital compass, a thermometer, a GPS device, a humidity sensor, a chemical sensor, or a radiation sensor.

In accordance with some embodiments, the concealment system further includes a power source coupled to the processor, where the power source is a battery or solar panel.

In accordance with some embodiments, the concealment system further includes a power source coupled to the processor, where the power source is an external AC power connected to the system via an AC/DC adapter.

In accordance with some embodiments, the at least one wireless communication module is configured not to broadcast its Service Set Identifier (SSID) so as to reduce detection.

In accordance with some embodiments, the at least one sensor includes a motion sensor configured to detect motion, and the processor is configured to: receive from the at least one sensor interface an indication of detected motion; in response to receiving the indication of detected motion, instructing the at least one wireless communication module to cease all wireless communication; and after a predetermined duration during which no further motion is detected, instruct the at least one wireless communication module to reestablish wireless communication.

Other embodiments provide a concealment system that includes a flexible circuit board that can be bent to conform to the inner surface of the host device. In some embodiments, the circuit board includes: a processor coupled to a bus; at least one sensor interface electrically coupled to the processor, the at least one sensor interface configured to connect to at least one sensor for capturing information; a real-time clock electrically coupled to the processor, the real time clock configured to generate timestamps; a tamper protection module electrically coupled to the processor, the tamper protection module configured to: receive the captured information from the at least one sensor interface, add the timestamps generated by the real-time clock to the captured information, and generate encrypted the captured information data; at least one wireless communication module electrically coupled to the processor, the at least one wireless communication module configured to wirelessly connect to at least one wireless communication antenna to transmit the encrypted data captured information to a remote device; and rewritable memory electrically coupled to the processor, the rewritable memory configured to store the encrypted captured information.

Providing a concealment system with a small universal surveillance module as the core of the system allows for a compact and flexible design, thereby increasing the effectiveness, efficiency of deployment, and user satisfaction with such systems. Such systems and interfaces may complement or replace conventional surveillance system.

The above summary provides a basic description of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Various embodiments of systems within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the various embodiments may be practiced without these specific details. In other instances, well-known methods, procedures, or components have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, integers, steps, operations, elements, components, and/or groups thereof.

Figure 1:
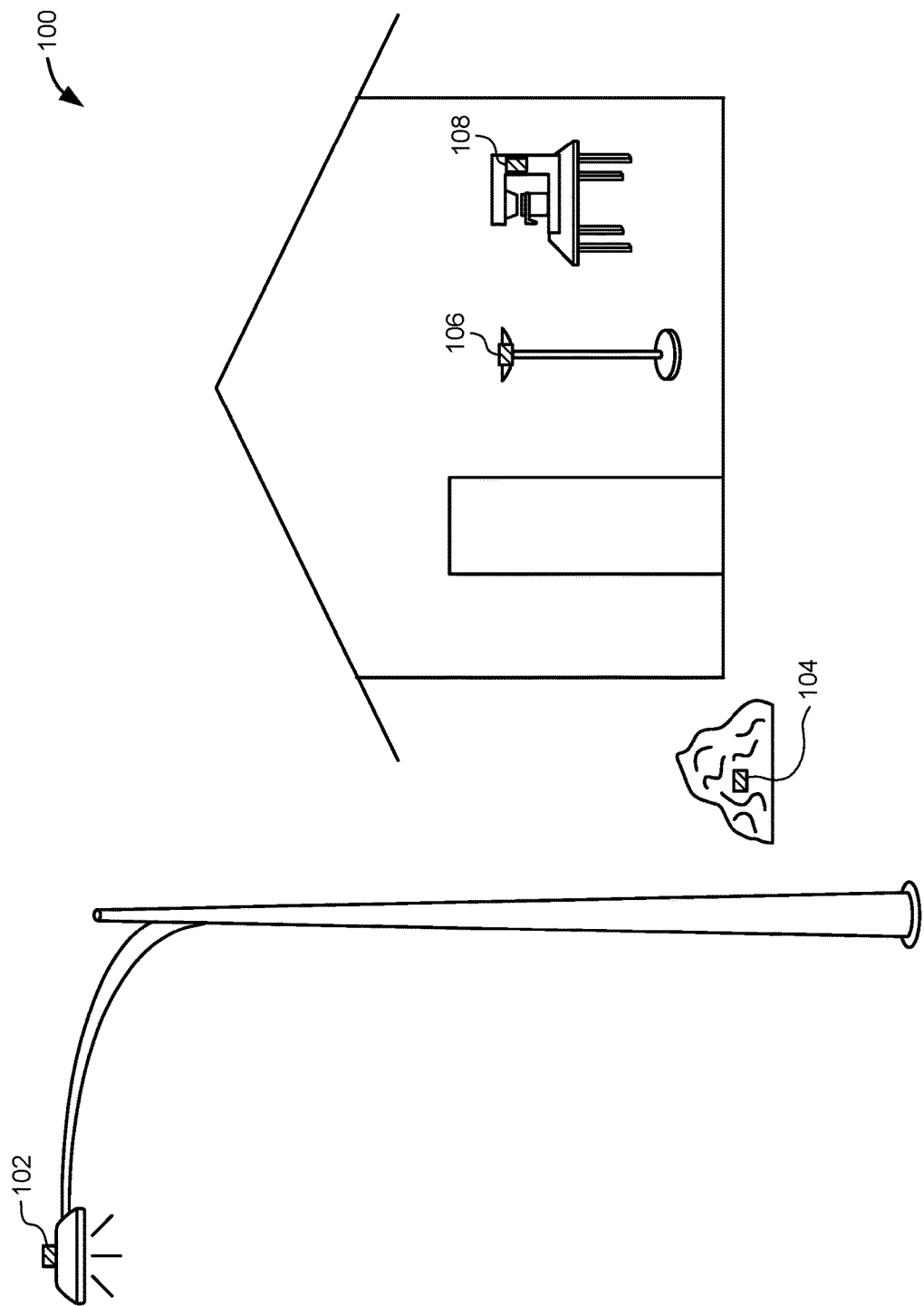
FIG. 1 is a diagram of various usages of surveillance systems, in accordance with some embodiments.

Described below is a concealment system that allows a user to efficiently deploy concealed surveillance. FIG. 1 illustrates various usages of surveillance systems, in accordance with some embodiments. In some embodiments, a concealed surveillance system includes a core system (the body) and various sized cables (think of legs extending from the body) connecting sensors and accessories, e.g., cameras, microphones, motion sensors, vibration sensors, humidity sensors, chemical sensors, radiation sensors, etc.

The core system is a universal surveillance module, which will be described in greater detail below with reference to FIGS. 2-5. To configure a concealed surveillance system, preferred sensors and sensor locations are first identified. Once the sensors and sensor locations are identified, variable length cables are selected to connect the core system to the sensors. An attachment system is used to install the core system, the sensors, and the cables into the concealment. In some embodiments, the attachment system includes cable connecting clips having either tie-downs or adhesive backs and/or liquid adhesive that mount and/or attach the sensors or other electronic components inside a concealment. For example, as shown in FIG. 1, concealment systems can be hidden inside a wall, a street light (e.g., 102), a fake rock (e.g., 104), a lamp (e.g., 106), a coffee maker (e.g., 108), and/or a scale etc., to allow for inconspicuous observation of a suspect or target.

Figure 2:
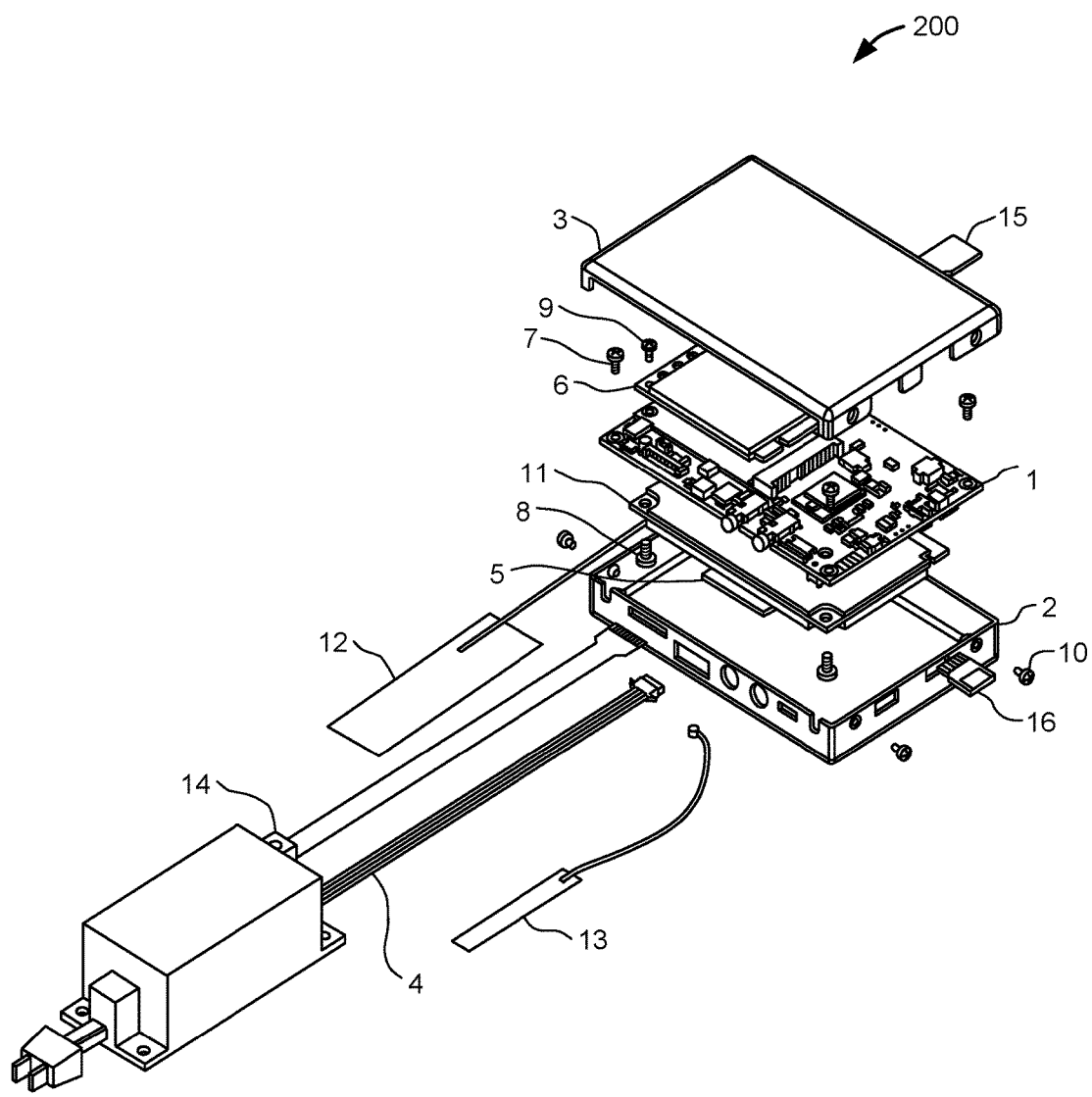
FIG. 2 is a perspective view of a concealment system used in the various surveillance systems of FIG. 1.

FIG. 2 is a perspective view of a concealment system 200, in accordance with some embodiments. In some embodiments, the concealment system 200 is a universal surveillance module that provides the core functionality of a covert surveillance system. Electronic components are arranged in layers inside the core system, are electrically coupled to each other, and are mounted in a housing 2 with cover 3 using various hardware mounts 7-10. In some embodiments, the housing is made from aluminum, while in other embodiments, the housing is made from a plastic or other suitable material that does not block RF signals, or alternatively, prevents detection. In some embodiments, the concealment system 200 is compact such that the housing 2 defines an internal volume of 6 cu inches or less. In some embodiments, the compact housing has a first dimension or 4 inches or less, a second dimension of 3 inches or less, and a third dimension of 0.5 inches or less. The small size of the housing is one important feature of this invention.

In some embodiments, both the housing 2 and the cover 3 are powder coated to protect against any environmental elements that the concealment system 200 might be exposed to. Power is supplied to the concealment system 200 either via a battery, a solar panel, and/or external power, e.g., an AC to DC transformer or charging adaptor 4, for convenience and adaptability in locations that can tolerate tethered use. For example, in the exemplary various usages of covert surveillance systems 100 (FIG. 1), the power source for the concealment 102 attached to a street light can be a solar panel and/or a battery, while the power source for indoor concealments 104-108 can be AC or DC power. Due to the compact size of the unit, thermal tape 5 is used to attach the heat generating components to the housing, which can then dissipate heat to prevent overheating of the concealment system 200 while in operation.

In some embodiments, the concealment system 200 includes a small, circuit board (e.g., carrier board 1) that centralizes the processing of sensors electrically coupled to the concealment system 200, e.g., hidden cameras via camera connector 14, microphones, power sources, or other sensors. Using a carrier board provides benefits in many cases, as it can implement special I/O interfaces, memory devices, connectors or form factors. In some embodiments, this circuit board is thermally coupled to one inner side of the housing so that it can dissipate heat.

In some embodiments, a separate circuit board (e.g., system on module (SOM) 11) is removably coupled to the carrier board 1 inside housing 2. In some embodiments, the processor and rewritable memory are mounted on the SOM 11, and at least one sensor interface, real-time clock, tamper protection module, and at least one wireless communication module are mounted on the carrier board 1. The processor, rewritable memory, sensor interface, real-time clock, tamper protection module, and wireless communication module are described in greater detail below with respect to FIG. 3.

Those embodiments that separate the carrier board 1 and SOM 11 are more modular and more easily upgradeable. A carrier board that is tailored to a special application may involve high design overheads by itself. If the actual processor and main I/O controllers are located on the SOM 11, it is easier, for example, to upgrade a CPU component to the next generation without having to redesign a specialized carrier board 1 as well. This can save costs and shorten modernization upgrade times. In some embodiments, SOM 11 is a low power unit. The highly efficient SOM 11 can be integrated with low power DDR2 RAM (e.g., up to 2 GB of DDR2 RAM), and an interface for mass storage is also mounted on SOM 11, e.g., a micro-SDHC card slot for plugging in micro SD memory card 16.

In some embodiments, the integrated SOM 11 has a first dimension of 3.5 inches or less and a second dimension of 2 inches or less, e.g., packaged onto a small 2.0"×3.2" circuit card. In some embodiments, a standard 314-pin MXM v3.0 interface connector allows for ultimate design flexibility by routing all signals from the processor to the connector.

In some embodiments, at least one wireless communication module is included in the concealment system 200. The at least one wireless communication module receives and sends radio frequency (RF) signals, also called electromagnetic signals. The at least one wireless communication module converts electrical signals to/from electromagnetic signals and communicates with communications networks and other communications devices via the electromagnetic signals. The at least one wireless communication module may include well-known sub-components for performing these functions. For example, a micro subscriber identity module (SIM) card 15 and mini PCI-E wireless card 6 can be configured to wirelessly connect to at least one wireless communication antenna (e.g., cellular RF antenna 12 and Wi-Fi 2.4 GHz antenna 13) for wireless data transmission. In some embodiments, the wireless card 6 uses 2-transmitter and 2-receiver multiple input/multiple output design over 2.4 GHz frequency. In some embodiments, housing 2 is radio frequency (RF) transparent, and the at least one wireless communication antenna are internal to the housing 2, e.g., cellular RF Antenna 12 and Wi-Fi 2.4 GHz antenna 13 can be mounted inside housing 2.

The at least one wireless communication module may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Figure 3:
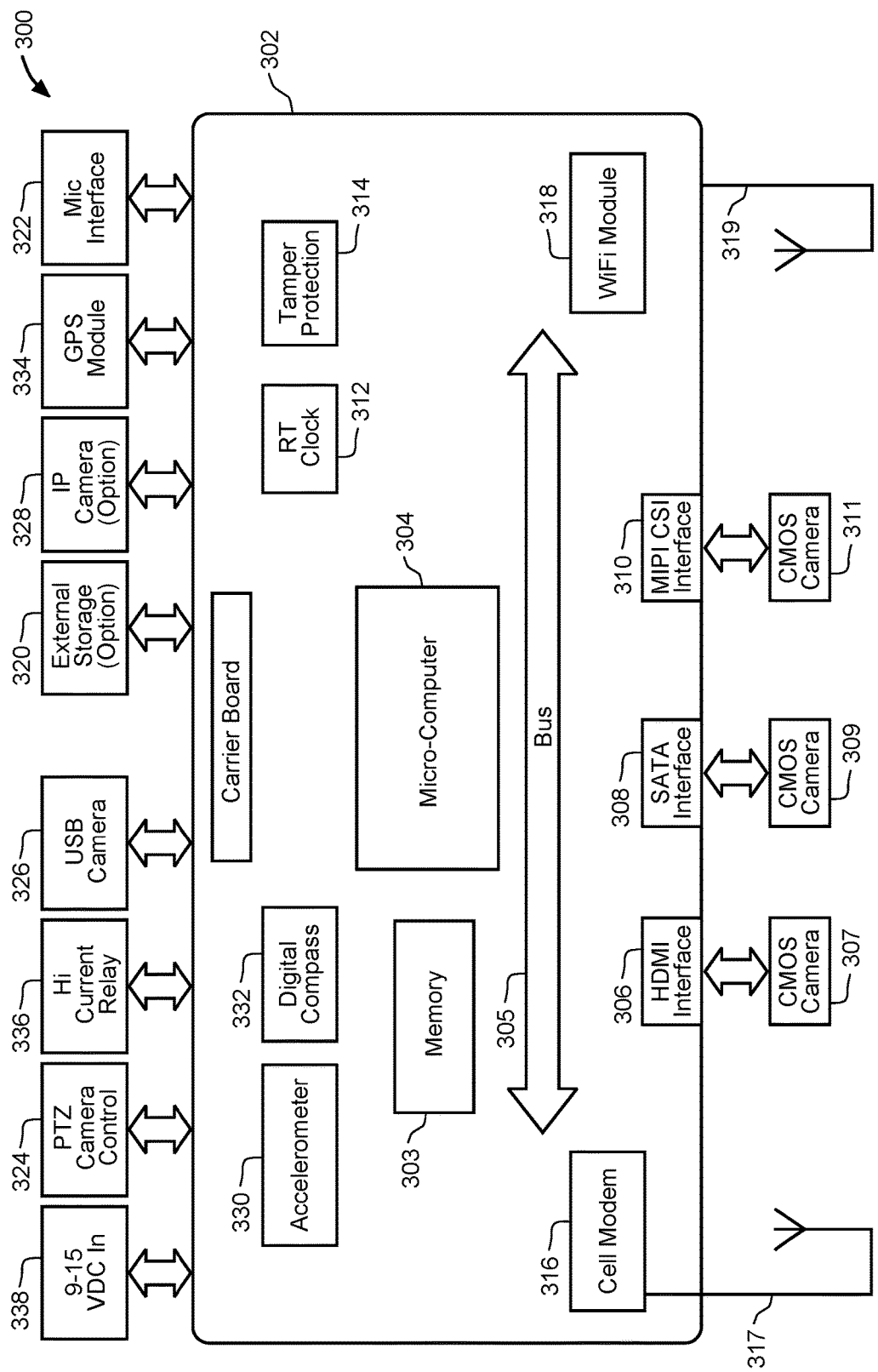
FIG. 3 is a system diagram of a concealment system, in accordance with some embodiments.

FIG. 3 is a system diagram of a concealment system 300, in accordance with some embodiments. Instead of having two circuit board electrically coupled in the concealment system 200 as shown in FIG. 2, in some embodiments, a single circuit board 302 provides the processing needs of sensors electrically coupled to the concealment system 300. In some embodiments, electronic components integrated on the circuit board 302 includes a processor 304, including I/O controllers, memory 303 (which may include one or more computer readable storage mediums) including low power memory, and other components electrically coupled to the processor 304 and that communicate over one or more communication buses or signal lines 305. In some embodiments, executable instructions for performing functions such as multi-media data processing and tamper protection are, optionally, included in a non-transitory computer readable storage medium or other computer program product configured for execution by the processor 304.

Components that are electrically coupled to the processor include:
at least one sensor interface configured to connect to at least one sensor for capturing information, e.g., HDMI interface 306 connected to CMOS camera, SATA interface 308 connected to CMOS camera 309, MIPI CSI interface 310 connected to CMOS camera 311, microphone interface 322 for connecting multiple microphones to face different directions or placements in different parts of the concealment device in which the surveillance concealment system to be concealed, interface to connect to accelerometer 330 (alternatively, the accelerometer 330 may be coupled to the input controller in the processor 304), and/or interface to connect to digital compass 332 (alternatively, the digital compass 332 may be coupled to the input controller in the processor 304);
real-time clock 312 configured to generate in-line timestamps for chain-of-custody evidence; in some embodiments, an integral battery backed up real-time clock provides an alterable time and data stamp;
tamper protection module 314 configured to receive the captured information from the at least one sensor interface, add the timestamps generated by the real-time clock 312 to the captured information, and encrypt the captured information;
at least one wireless communication module, where the at least one wireless communication module configured to wirelessly connect to at least one wireless communication antenna to transmit the encrypted captured information to a remote device, e.g., cell modem 316 is configured to connect (wired or wirelessly) to antenna 317 and/or WiFi module 318 is configured to connected (wired or wirelessly) to antenna 319; and
rewritable memory 320 electrically coupled to the processor, where the rewritable memory configured to store the encrypted captured information.

In some embodiments, the core system is connected to multiple cameras that use different capture and/or communication technologies and the system includes multiple camera interfaces, each configured for its respective camera capture and/or communication technology. For example, as shown in FIG. 3, external CMOS cameras can be connected to different interfaces 306, 308, and 310 to capture HD MIPI-CSI video input (ONVIF S profile complaint) w/streaming capability and output as Micro HDMI. In addition, other types of interfaces can be provided to connect to other types of cameras or used for remote controls of cameras, e.g., pan-tile-zoom (PTZ) camera control 324, USB camera 326, and/or IP camera 328.

In some embodiments, the captured information includes audio, video, or audio and video frames, e.g., encoding camera video and microphone audio into h.264. The tamper protection module includes circuitry to collect data from sensors and pass along the sensed data to the processor for tamper protection, so that the captured data cannot be changed or tampered with since its original creation. In some embodiments, a sequential number is added to each successive frame of video and/or audio data. In some embodiments, in addition to adding timestamps and/or a sequential number for tamper protection, a unique encryption (private and/or public) key is assigned to each core unit. As the video (and/or audio) file that is generated is closed, a cryptographic hash is automatically, and without human intervention, created and then encrypted with the key. In some embodiments, the captured information is encrypted using Advanced Encryption Standard (AES) algorithm with an at least 256 bits key size. The encrypted cryptographic hash is then appended to the end of the video file. In some embodiments, the encrypted video files and the public key are stored on the rewritable memory 320 (e.g., micro SD card 16, FIG. 1). The public key can be used to decrypt the cryptographic hash and then that can be used to validate that the video files have not been altered since it was recorded. In other embodiments, instead of storing the data on the rewritable memory 320, the concealment system transmits the encrypted data to a remote source (e.g., via Wi-Fi 802.11 b/g/n or cellular), such that an operator can remotely play the video/audio streaming in real-time or near real-time. In yet some other embodiments, the concealment system automatically, without human intervention, switches between real-time transmission of video data and local storing to reduce detection of wireless transmit signal. The switching can also be performed manually by an operator, e.g., through Hi current relay 336 to turn on or off a sub-system or sub-component of the concealment system 300.

In some embodiments, the at least one wireless communication module for transmitting the data is configured not to broadcast its Service Set Identifier (SSID) so as to reduce detection. In such embodiments, the wireless communication module, as well as other components in the system 300 can be remotely configured or activated, e.g., with smartphone or laptop via Wi-Fi or 4G/LTE to enter a SSID preconfigured for the wireless communication module, or through Hi current relay 336.

In some embodiments, a motion sensor is electrically coupled to the processor 304 and configured to detect motion. In response to receiving an indication of detected motion, the concealment system ceases all wireless communications to avoid detection, and instead records to local memory. After a predetermined duration during which no further motion is detected, the processor instructs the at least one wireless communication module to reestablish wireless communication. At this time, the stored data can be transmitted wirelessly.

Similarly, when the concealment is mounted to a moveable object, sensors such as accelerometer(s) 168, magnetometer (not shown) and/or a GPS module 334 are coupled to the concealment system 300 for obtaining information concerning the location and orientation of system 300. Movements of the system 300 can be detected and tracked. Speed (magnitude), velocity (magnitude and direction), and/or acceleration (a change in magnitude and/or direction) of the movement can be analyze to determine whether to transmit data wirelessly.

In some embodiments, the concealment system is enclosed in a housing made of rigid materials, e.g., aluminum, as shown in FIG. 2. In other embodiments, a concealment system does not have an enclosure and comprises a circuit board made of flexible material(s). The flexible circuit board can be bent to conform to the inner surface of a host device for covert surveillance. Similar to an inflexible board within a housing, the flexible circuit board include integrated components including but not limited to: a processor coupled to a bus; at least one sensor interface electrically coupled to the processor; a real-time clock electrically coupled to the processor; a tamper protection module electrically coupled to the processor; at least one wireless communication module electrically coupled to the processor; and rewritable memory electrically coupled to the processor.

Figure 4:
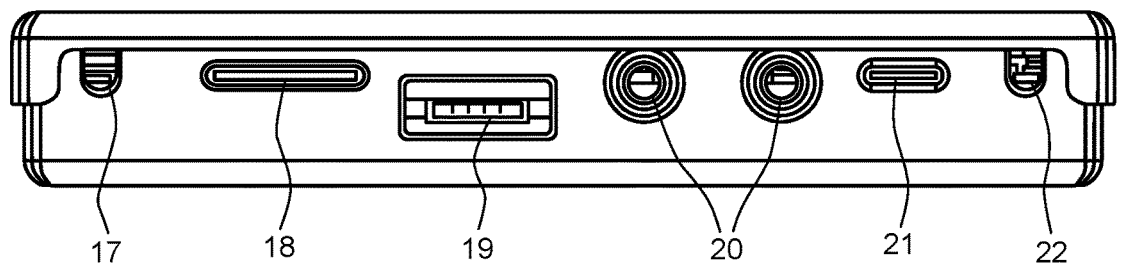
FIGS. 4 and 5 are side views of a concealment system, in accordance with some embodiments.

FIG. 4 is a front view of the concealment system 200. As shown in FIG. 4, the concealment system includes a cellular antenna jack 17 for connecting the external cellular RF antenna 12 (FIG. 2) to the cell modem 316 (FIG. 3), a camera connector 18 for connecting hidden cameras via the camera connector 14 (FIG. 2) to compatible camera interfaces, a power input connector 19 for connecting the AC charging adapter 4 (FIG. 2) to the DC voltage source (VDC) in 338 (FIG. 3), one or more microphone adapters 20 for connecting microphones to microphone interfaces 322 (FIG. 3), a GPS port 50 for connecting to the GPS module 334 (FIG. 3), and a Wi-Fi antenna connector 22 for connecting the external cellular WiFi antenna 13 (FIG. 2) to the WiFi module 318.

Figure 5:
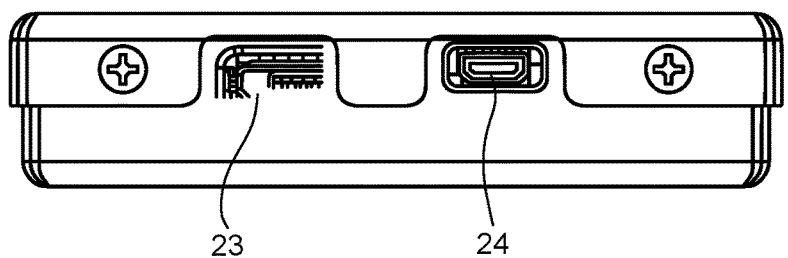

FIG. 5 is a right side view of the concealment system 200. As shown in FIG. 5, in some embodiments, the concealment system includes a USB port 23 for uploading downloading data and in some embodiments upgrading of firmware, and a Micro HDMI connector 24 for video transmission.

While the present invention has been described in terms of the foregoing embodiments and applications, in both summarized and detailed forms, it is not intended that these descriptions in any way limit its scope to any such embodiments and applications, and those skilled in the art will recognize that the invention is not limited to the epitomes described. It will be understood that many substitutions, changes and variations in the described embodiments, applications and details of the method and system illustrated herein and of their operation can be made without departing from the spirit and scope of this invention including the appended claims. Thus, the description is to be regarded as illustrative instead of restrictive on the present invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A concealment system configured to be concealed for covert surveillance, the concealment system comprising:
    a housing configured to be concealed within an object for covert surveillance, the housing enclosing:
        a processor;
        at least one sensor interface electrically coupled to the processor, the sensor interface configured to connect to at least one external sensor for capturing information, the at least one external sensor being separate from the housing;
        a real-time clock electrically coupled to the processor, the real time clock configured to generate timestamps;
        a tamper protection module electrically coupled to the processor, the tamper protection module configured to:
            receive the information captured by the at least one external sensor via the at least one sensor interface,
            add the timestamps generated by the real-time clock to the captured information, and
            encrypt the captured information;
        at least one wireless communication module electrically coupled to the processor, the at least one wireless communication module configured to wirelessly connect to at least one wireless communication antenna to transmit the encrypted captured information to a remote device; and
        rewritable memory electrically coupled to the processor, the rewritable memory configured to store the encrypted captured information.

2. The system of claim 1, wherein the housing defines an internal volume of 6 cu inches or less.

3. The system of claim 1, wherein the housing has a first dimension of 4 inches or less, a second dimension of 3 inches or less, and a third dimension of 0.5 inches or less.

4. The system of claim 1, further comprising a single circuit board on which the processor, at least one sensor interface, real-time clock, tamper protection module, and at least one wireless communication module are mounted.

5. The system of claim 1, further comprising a primary circuit board, and a secondary circuit board removably coupled to the primary circuit board within the housing, wherein the processor, including I/O controllers, and the rewritable memory, including low power memory, are mounted on the secondary circuit board, and the at least one sensor interface, the real-time clock, the tamper protection module, and the at least one wireless communication module are mounted on the primary circuit board.

6. The system of claim 4, wherein the rewritable memory is a removable SD card coupled to an interface mounted on the secondary circuit board.

7. The system of claim 4, wherein the secondary circuit board has a first dimension of 3.5 inches or less, and a second dimension of 2 inches or less.

8. The system of claim 1, wherein:
the captured information includes audio, video, or audio and video frames, and
the tamper protection module adds a sequential number to each successive frame.

9. The system of claim 1, wherein the captured information is encrypted using Advanced Encryption Standard (AES) algorithm.

10. The system of claim 1, wherein the captured information is encrypted using an at least 256 bits key size.

11. The system of claim 1, wherein the housing is radio frequency (RF) transparent, and the at least one wireless communication antenna is internal to the housing.

12. The system of claim 1, wherein the at least one external sensor is clipped to the object in which the surveillance concealment system is concealed.

13. The system of claim 1, wherein:
the at least one external sensor includes multiple cameras that use different capture or communication technologies, and
the at least one sensor interface includes multiple camera interfaces, each configured for its respective camera capture or communication technology.

14. The system of claim 1, wherein the at least one external sensor includes multiple microphones for facing different directions or placements in different parts of the object in which the surveillance concealment system is concealed.

15. The system of claim 1, wherein the at least one external sensor includes an accelerometer, a digital compass, a thermometer, a GPS device, a humidity sensor, a chemical sensor, or a radiation sensor.

16. The system of claim 1, further comprising a power source coupled to the processor, wherein the power source is a battery or solar panel.

17. The system of claim 1, further comprising a power source coupled to the processor, wherein the power source is an external AC power connected to the system via an AC/DC adapter.

18. The system of claim 1, wherein the at least one wireless communication module is configured not to broadcast its Service Set Identifier (SSID) so as to reduce detection.

19. The system of claim 1, wherein:
the at least one external sensor includes a motion sensor configured to detect motion, and
the processor is configured to:
receive from the at least one sensor interface an indication of detected motion;
in response to receiving the indication of detected motion, instruct the at least one wireless communication module to cease all wireless communication; and
after a predetermined duration during which no further motion is detected, instruct the at least one wireless communication module to reestablish wireless communication.

20. A concealment system configured to be concealed within an object for covert surveillance, the concealment system comprises a flexible circuit board that can be bent to conform to the inner surface of the object, the circuit board comprising:
a processor coupled to a bus;
at least one sensor interface electrically coupled to the processor, the at least one sensor interface configured to connect to at least one external sensor for capturing information, the at least one external sensor being separate from the housing;
a real-time clock electrically coupled to the processor, the real time clock configured to generate timestamps;
a tamper protection module electrically coupled to the processor, the tamper protection module configured to:
receive the captured information captured by the at least one external sensor via the at least one sensor interface,
add the timestamps generated by the real-time clock to the captured information, and
generate encrypted the captured information data;
at least one wireless communication module electrically coupled to the processor, the at least one wireless communication module configured to wirelessly connect to at least one wireless communication antenna to transmit the encrypted data captured information to a remote device; and
rewritable memory electrically coupled to the processor, the rewritable memory configured to store the encrypted captured information.

* * * * *

UNITED STATES PATENT AND TRADEMARK OFFICE
CERTIFICATE OF CORRECTION

PATENT NO. : 10,165,158 B2  
APPLICATION NO. : 15/212147  
DATED : December 25, 2018  
INVENTOR(S) : Carpenter et al.

Page 1 of 1

It is certified that error appears in the above-identified patent and that said Letters Patent is hereby corrected as shown below:

In the Claims

Claim 17, Column 12, Line 3, please delete "power connected" and insert --power source connected--;

Claim 20, Column 12, Line 25, please delete "system comprises a" and insert --system comprising a--;

Claim 20, Column 12, Line 38, please delete "the captured information" and insert --the information--;

Claim 20, Column 12, Line 43, please delete "generate encrypted the captured" and insert --encrypt the captured--;

Claim 20, Column 12, Line 43, please delete "information data," and insert --information,--;

Claim 20, Column 12, Line 48, please delete "encrypted data captured" and insert --encrypted captured--.

Signed and Sealed this  
Twenty-sixth Day of March, 2019

Andrei Iancu  
*Director of the United States Patent and Trademark Office*